(12) United States Patent
Volk et al.

(10) Patent No.: US 12,466,016 B2
(45) Date of Patent: *Nov. 11, 2025

(54) QUICK-CHANGE SYSTEM, ROTARY INDEXING TABLE HAVING A QUICK-CHANGE SYSTEM OF THIS TYPE, AND USE

(71) Applicant: Schaeffler Technologies AG & Co. KG, Herzogenaurach (DE)

(72) Inventors: Wolfgang Volk, Frensdorf (DE); Lutz Mueller, Dachsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 880 days.

This patent is subject to a terminal disclaimer.

(21) Appl. No.: 17/617,612

(22) PCT Filed: Jun. 19, 2020

(86) PCT No.: PCT/DE2020/100522
§ 371 (c)(1),
(2) Date: Dec. 9, 2021

(87) PCT Pub. No.: WO2020/259754
PCT Pub. Date: Dec. 30, 2020

(65) Prior Publication Data
US 2022/0234118 A1    Jul. 28, 2022

(30) Foreign Application Priority Data
Jun. 28, 2019    (DE) .................... 10 2019 117 457.0

(51) Int. Cl.
*B23Q 3/155*    (2006.01)

(52) U.S. Cl.
CPC ............. *B23Q 3/15526* (2013.01); *B23Q 2003/15527* (2016.11)

(58) Field of Classification Search
CPC ........... B23Q 3/15526; B23Q 3/15533; B23Q 2003/15527; B23Q 2003/15532
See application file for complete search history.

(56) References Cited

U.S. PATENT DOCUMENTS 4,630,979 A * 12/1986 Roux ................. B23B 31/06
                                                     408/239 R
5,947,484 A    9/1999 Huggins et al.
(Continued)

FOREIGN PATENT DOCUMENTS

CN    1210053 A    3/1999
CN    202758155 U1    2/2013
(Continued)

OTHER PUBLICATIONS

Provided as translation for CN1210053A, 1999.

*Primary Examiner* — Eric A. Gates

(57) ABSTRACT

A quick-change system includes an exchange tool with a ball receiving opening, a receiving part with a receiving opening for receiving the exchange tool, and a ball catch for temporarily fixing the exchange tool on the receiving part. The ball catch includes a sleeve that is closed on one side and a spring-mounted press-ball arranged in the sleeve for manually engaging and disengaging with the ball-receiving opening. In an example embodiment, the sleeve has an axis of symmetry, the spring-mounted press-ball is movable along the axis of symmetry, and the ball-receiving opening has a central axis extending parallel to the axis of symmetry when the receiving part is engaged with the exchange tool.

12 Claims, 4 Drawing Sheets

(56) References Cited

U.S. PATENT DOCUMENTS

| | | | | |
|---|---|---|---|---|
| 7,115,083 B2 * | 10/2006 | Liu | ................ | B23Q 3/15553 |
| | | | | 483/65 |
| 11,858,124 B2 * | 1/2024 | Volk | ................ | B25J 15/0475 |

FOREIGN PATENT DOCUMENTS

| | | | | |
|---|---|---|---|---|
| CN | 104999341 A | | 10/2015 | |
| CN | 106994614 A | | 8/2017 | |
| CN | 208976912 U | | 6/2019 | |
| CN | 111590370 A | * | 8/2020 | |
| DE | 67854 C | | 5/1892 | |
| DE | 67854 A | | 7/1969 | |
| DE | 3341252 A1 | | 5/1985 | |
| DE | 8524218 U1 | | 1/1986 | |
| DE | 3512929 A1 | | 10/1986 | |
| DE | 3841734 A1 | | 6/1990 | |
| DE | 29906328 U1 | | 6/1999 | |
| DE | 10154876 C1 | | 2/2003 | |
| DE | 10304507 B3 | | 10/2004 | |
| JP | H01289633 A | | 11/1989 | |
| JP | H04360703 A | | 12/1992 | |
| JP | 2002192409 A | | 7/2002 | |
| JP | 2013052453 A | | 3/2013 | |
| JP | 3217883 U | | 9/2018 | |
| WO | WO-2018110856 A1 | * | 6/2018 | ............. B24B 23/02 |

\* cited by examiner

QUICK-CHANGE SYSTEM, ROTARY INDEXING TABLE HAVING A QUICK-CHANGE SYSTEM OF THIS TYPE, AND USE

CROSS-REFERENCE TO RELATED APPLICATIONS

This application is the United States National Phase of PCT Appln. No. PCT/DE2020/100522 filed Jun. 19, 2020, which claims priority to German Application No. DE102019117457.0 filed Jun. 28, 2019, the entire disclosures of which are incorporated by reference herein.

TECHNICAL FIELD

The present disclosure relates to a quick-change system including at least one receiving part and at least one exchange tool. The receiving part has at least one receiving opening for receiving each exchange tool. The present disclosure further relates to a rotary indexing table with a quick-change system and the use thereof.

BACKGROUND

Quick-change systems of the type mentioned at the outset are known, for example, from DE 103 04 507 D1. The exchange tool system described therein is provided for the detachable coupling of tools to handling devices. In this case, an exchange head, an exchange adapter, and locking means are provided for locking the exchange head with the exchange adapter. The locking means includes an elastically deformable actuating component, which, in the locked state, acts on the locking elements in a resiliently pre-tensioned manner such that the locking elements are held in their respective locked position.

SUMMARY

Example embodiments broadly comprise a quick-change system with at least one receiving part and at least one exchange tool. The receiving part has at least one receiving opening for receiving each exchange tool. At least one ball catch is provided for temporarily fixing the exchange tool on the receiving part, in which the ball catch includes a sleeve that is closed on one side, in which a spring-mounted press ball is arranged, and in which the press ball can be manually engaged in a ball-receiving opening on the exchange tool and disengaged again.

The quick-change system can be used in a space-saving manner, and it can be used without a further tool. The manual engagement and disengagement of the exchange tool is possible because the retaining forces between the exchange tool and the receiving part can be held in a manually operable frame. Thus, machines with such quick-change systems can be quickly retrofitted and require less personnel effort.

A ball-receiving opening in this case is understood to be, for example, a recess, a blind hole, a cutout, a contiguous drill hole, a cut, a groove, and the like which is dimensioned such that an engagement of a press ball arranged correspondingly thereto is possible.

In an example embodiment, the sleeve of the ball catch, which sleeve is closed on one side, has an axis of symmetry S, in which the press ball can be moved along the axis of symmetry S, and in which the ball-receiving opening has a central axis M, which extends, in an engaged state of the receiving part and the exchange tool, in parallel as relates to the axis of symmetry S. In an example embodiment of the quick-change system according to the present disclosure, the axis of symmetry S and the central axis M extend, in the engaged state, in parallel at a distance A of from 1 to 3.5 mm. The retaining forces can be adjusted to an optimally manageable degree perpendicular as relates to the spring effect between the exchange tool and the receiving part by adjusting the distance A of the axis of symmetry S and the central axis M in the engaged state. The less the distance A, the less the retaining force. In this case, retaining forces can be set within a range of from 5 to 50 N.

The sleeve of the ball catch, which sleeve is closed on one side, is dimensioned in the area of its open side in this case such that the press ball is securely retained in the sleeve.

The receiving part and the exchange tool may be engaged such that the exchange tool can be pushed into the receiving opening in an engagement direction which extends perpendicularly as relates to the axis of symmetry S.

In this case, at least one exchange tool stop may be formed on the exchange tool, which stop enables establishing of the vertical position of the exchange tool in the receiving opening. Two exchange tool stops may be provided which reliably keep the exchange tool from moving within the receiving opening.

The ball-receiving opening may have a contact area which has contact with the press ball in the engaged state, in which the contact area is provided with an edge break, also referred to as a chamfer. In this case, an edge break in a range of from 0.2 to 0.4 mm has proven to be advantageous. The edge break in this case indicates the length of the distance between each of the two formed chamfering edges and the originally existing (and removed upon application of the chamfer) edge of the ball-receiving opening.

At least one centering pin may also be provided on the receiving part, which centering pin can be incorporated into a centering opening on the exchange tool. Alternatively, at least one centering pin is provided on the exchange tool, which centering pin can be incorporated into a centering opening on the receiving part. This prevents twisting of the receiving part relative to the exchange tool and fixes the exchange tool in the desired installation position.

Example embodiments also comprise a rotary indexing table which includes at least one quick-change system according to the present disclosure, or at least two quick-change systems according to the present disclosure.

The rotary indexing table according to the present disclosure has proven to be advantageous for mounting roller bearings or slide bearings or for machining roller bearings or slide bearing components. Furthermore, a use of such a rotary indexing table has proven to be advantageous for mounting or machining motor components.

BRIEF DESCRIPTION OF THE DRAWINGS

FIGS. 1a to 6 are intended to illustrate, by means of example, quick-change systems according to the present disclosure as well as a rotary indexing table which can be equipped therewith. The following is shown:

FIG. 1a shows a first quick-change system in a three-dimensional view,

FIG. 2 shows a second quick-change system in a three-dimensional view,

FIG. 3 shows the second quick-change system according to FIG. 2 in a three-dimensional view from below in a partial representation, FIG. 4 shows a section through one of the ball catches of the second quick-change system according to FIGS. 2 and 3.

FIG. 5 shows an example of a ball catch with an engaged press ball in an enlarged view in the section, and FIG. 6 shows a rotary indexing table.

DETAILED DESCRIPTION

Figure 1A:
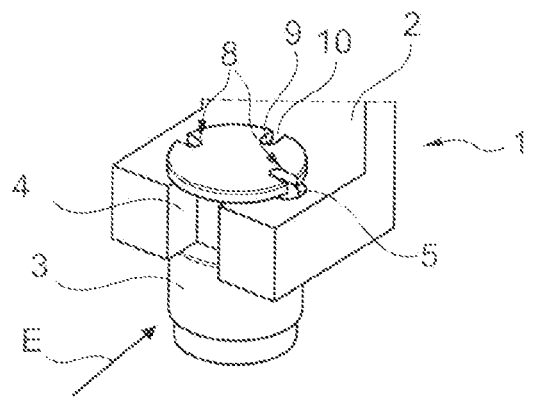
Figure 1B:
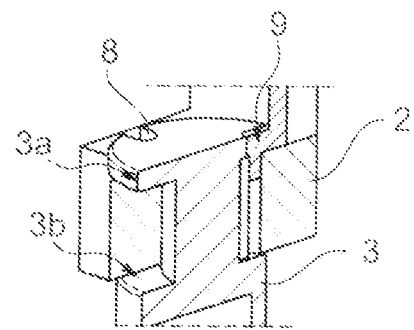
FIG. 1b shows the first quick-change system according to FIG. 1a in a longitudinal section.
Figure 1C:
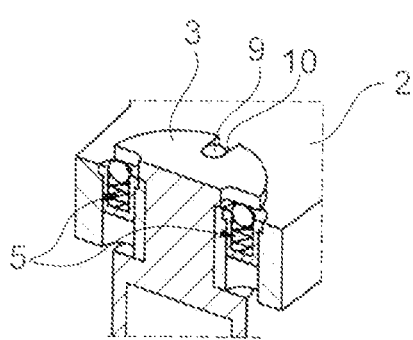
FIG. 1c shows the first quick-change system according to FIG. 1a in a cross-section through the ball catch.

FIGS. 1a to 1c show a first quick-change system 1 in a three-dimensional view, in which FIG. 1b shows the first quick-change system 1 according to FIG. 1a in a longitudinal section, and FIG. 1c shows the first quick-change system 1 according to FIG. 1a in a cross-section through the ball catch 5. The same reference symbols in FIGS. 1a to 1c denote the same elements.

The first quick-change system 1 includes a receiving part 2 and an exchange tool 3, in which the receiving part 2 has a receiving opening 4 for receiving the exchange tool 3. Furthermore, two ball catches 5 (cf. FIG. 1c) are provided on the receiving part 2 for temporarily fixing the exchange part 3 on the receiving part 2. Each ball catch 5 includes a sleeve 6 (see FIG. 5) that is closed on one side, in which a spring-mounted press ball 7 is arranged. The press balls 7 can be manually engaged on the exchange tool 3 with each ball-receiving opening 8 and then disengaged again therefrom in order to quickly implement, for example, a change to a differently dimensioned exchange tool 3' (cf. FIGS. 2 to 4) or to an exchange tool designed for a different machining process.

In order to attach the exchange tool 3 so as to prevent twisting, a centering pin 9 is provided here on the receiving part 2, onto which centering pin a centering opening 10 on the exchange tool 3 can be shifted. The exchange tool 3 is manually moved onto the receiving part 2 in the engagement direction E in order to engage with the receiving part 2. The exchange tool stops 3a, 3b (cf. FIG. 1b) provided here on the exchange tool 3 are placed into contact above and below the receiving part 2, and the exchange tool 3 is moved into the receiving opening 4 until the two press balls 7 engage with the ball-receiving openings 8 and the centering pin 9 is within the centering opening 10.

Figure 2:
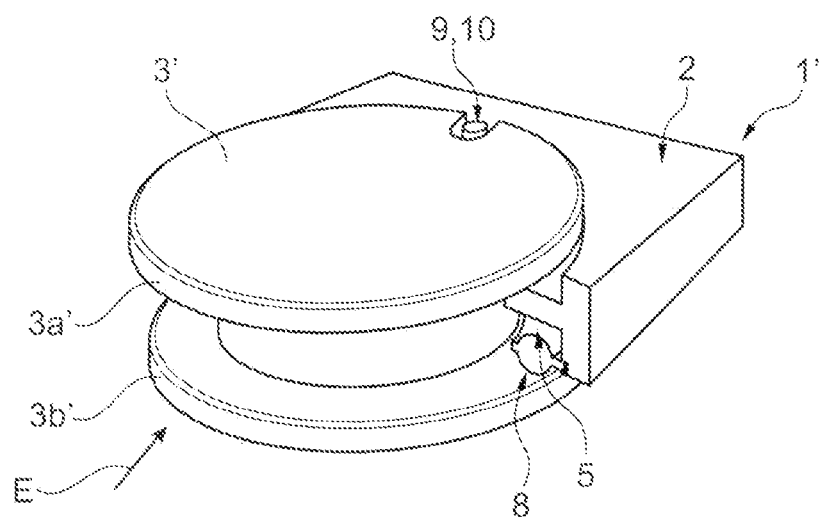

FIG. 2 shows a second quick-change system 1' in a three-dimensional view. The second quick-change system 1' includes a receiving part 2 and an exchange tool 3', in which the receiving part 2 has a receiving opening for receiving the exchange tool 3'. Two ball catches 5 are provided on the receiving part 2 for temporarily fixing the exchange part 3' on the receiving part 2, in which only one of the ball catches 5 is shown in the partial section and is visible. The press balls 7 (cf. FIG. 3) can be manually engaged on the exchange tool 3' with each ball-receiving opening 8 (cf. FIG. 3) and then disengaged again therefrom in order to quickly implement, for example, a change to a differently dimensioned exchange tool 3' (cf. FIG. 1a) or to an exchange tool designed for a different machining process.

In order to attach the exchange tool 3' so as to prevent twisting, a centering pin 9 is provided on the receiving part 2, onto which centering pin a centering opening 10 can be shifted on the exchange tool 3'. The exchange tool 3' is manually moved onto the receiving part 2 in the engagement direction E in order to engage with the receiving part 2. The exchange tool stops 3a', 3b' provided here on the exchange tool 3' are placed into contact above and below the receiving part 2, and the exchange tool 3' is moved into the receiving opening until the two press balls 7 (cf. FIG. 3) engage with the ball-receiving openings 8 and the centering pin 9 is within the centering opening 10.

Figure 3:
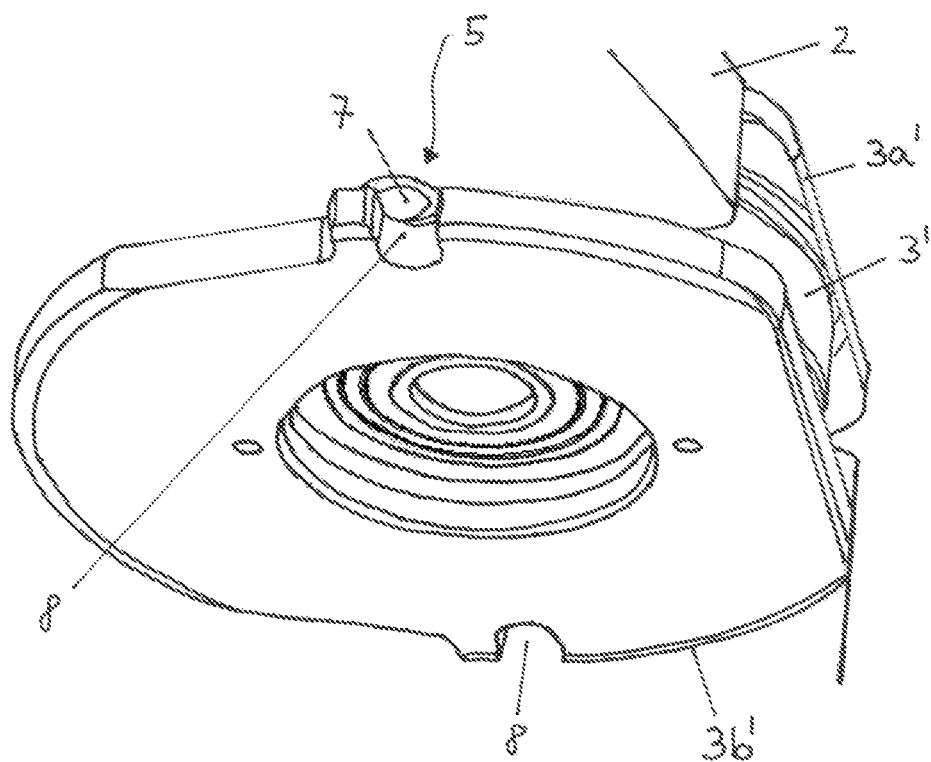

FIG. 3 shows the second quick-change system 1' according to FIG. 2 in a three-dimensional view from below in a partial representation. The same reference symbols as described in FIG. 2 above indicate the same elements.

Figure 4:
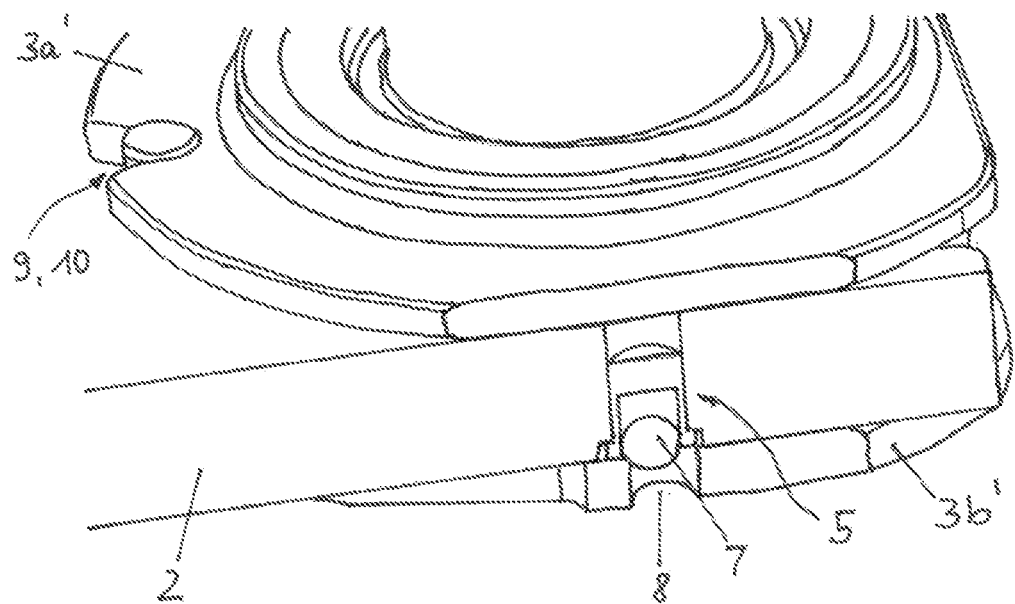

FIG. 4 shows a section through one of the ball catches 5 of the second quick-change system 1' according to FIGS. 2 and 3. The same reference symbols as described in FIG. 2 or 3 above indicate the same elements.

Figure 5:
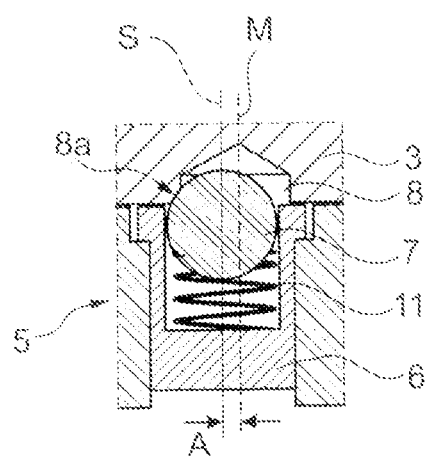

FIG. 5 shows an example of a possible ball catch 5 in an enlarged view in the section. Discernible is the sleeve 6 that is closed on one side, in which a press ball 7 spring-mounted by means of a spring element 11 is arranged. The sleeve 6 has an axis of symmetry S, in which the press ball 7 can be moved along the axis of symmetry S. A helical compression spring is provided in this case as the spring element 11; however, spring elements designed differently can also be used such as conical springs, disc springs, elements formed from an elastomer, and the like.

A section of an exchange tool 3, which is in the form of a blind hole in the region of a ball-receiving opening 8 in this case, is discernible above the ball catch 5. The ball-receiving opening 8 has a central axis M, which extends, in an engaged state of the receiving part 2 and the exchange tool 3, as shown here, in parallel as relates to the axis of symmetry S.

The axis of symmetry S and the central axis M extend, in the engaged state, in parallel to one another at a distance A in a range of from 1 to 3.5 mm. The selection of the distance A in this case has a direct impact on the retaining force between the exchange tool 3 and the receiving part 2 in the engaged state. The ball-receiving opening 8 has an edge break at least in the contact area 8a in which an edge of the ball-receiving opening 8 would make contact with the surface of the press ball 7. The selection of the size of the edge break in this case also has an impact on the retaining force between the exchange tool 3 and the receiving part 2 in the engaged state.

The specific design configuration as relates to the retaining force required in the respective application case can be determined using a few tests.

Figure 6:
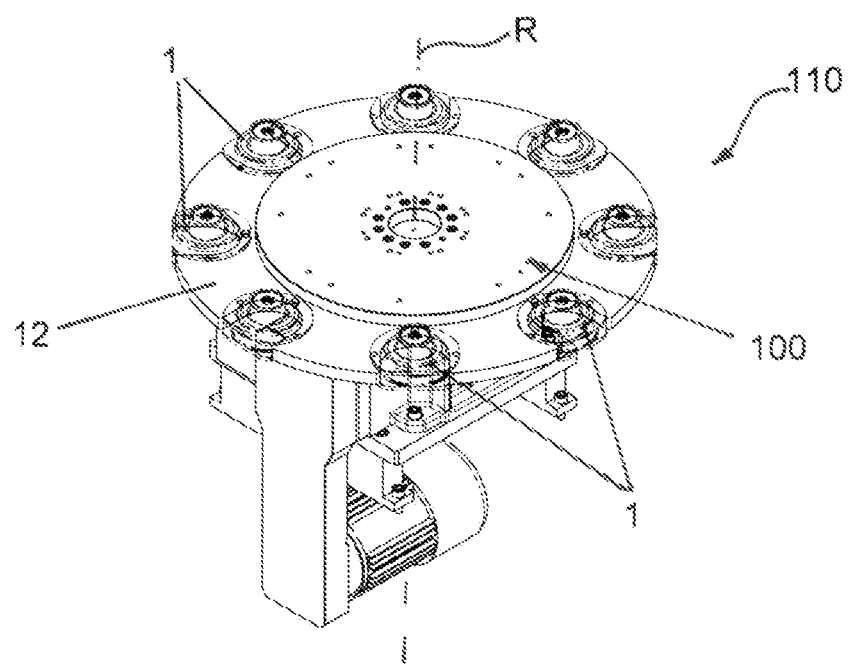

FIG. 6 shows a rotary indexing table unit 110 with a rotary indexing table 100. The rotary indexing table 100, including retainer 12, is rotatably arranged about an axis of rotation R. A plurality of first quick-change systems 1 (for example according to FIG. 1a), the receiving parts 2 of which are attached to the retainer 12, are situated on the rotary indexing table 100. In this case, the receiving parts 2 may also optionally be designed as one piece with the retainer 12. Retrofitting the rotary indexing table 100 to a different exchange tool 3 with the same receiving part 2 as before is efficient and purely manual; this means it can be performed without the use of an additional assembly tool and with minimal setup time.

| REFERENCE NUMERALS | |
|---|---|
| 1, 1' | Quick-change system |
| 2 | Receiving part |
| 3, 3' | Exchange tool |
| 3a, 3b, 3a', 3b' | Exchange tool stop |
| 4 | Receiving opening |
| 5 | Ball catch |
| 6 | Sleeve |
| 7 | Press ball |
| 8 | Ball-receiving opening |

-continued

| REFERENCE NUMERALS | |
|---|---|
| 8a | Contact area |
| 9 | Centering pin |
| 10 | Centering opening |
| 11 | Spring element |
| 12 | Retainer |
| 100 | Rotary indexing table |
| 110 | Rotary indexing table unit |
| A | Distance |
| S | Axis of symmetry |
| M | Central axis |
| E | Engaging direction |
| R | Axis of rotation |

The invention claimed is:

1. A quick-change system comprising:
an exchange tool comprising a ball-receiving opening with a central axis;
a receiving part comprising a receiving opening for receiving the exchange tool; and
a ball catch for temporarily fixing the exchange tool on the receiving part, the ball catch comprising:
a sleeve that is closed on one side, the sleeve comprising an axis of symmetry; and
a spring-mounted press ball arranged in the sleeve and movable along the axis of symmetry for manually engaging and disengaging with the ball-receiving opening, wherein the exchange tool is moved into the receiving opening in an engagement direction which extends perpendicular to the axis of symmetry to engage the exchange tool with the receiving part.

2. The quick-change system of claim 1, wherein:
the central axis extends parallel to the axis of symmetry when the receiving part is engaged with the exchange tool.

3. The quick-change system of claim 2, wherein a distance between the axis of symmetry and the central axis is 1 mm to 3.5 mm.

4. The quick-change system of claim 1, wherein the ball-receiving opening comprises a contact area with an edge break that contacts the press ball when the exchange tool is engaged with the receiving part.

5. The quick-change system of claim 1, wherein:
the receiving part comprises a centering pin and the exchange tool comprises a centering opening for receiving the centering pin; or
the exchange tool comprises a centering pin and the receiving part comprises a centering opening for receiving the centering pin.

6. A rotary indexing table comprising the quick-change system of claim 1.

7. A method of using the rotary indexing table of claim 6 for:
mounting roller bearings or slide bearings;
machining roller bearings or slide bearing components; or
mounting or machining motor components.

8. A rotary indexing table comprising at least two of the quick-change systems of claim 1.

9. A quick-change system comprising:
an exchange tool comprising a planar portion forming an exchange tool stop, the planar portion comprising a ball-receiving opening disposed therein;
a receiving part comprising a receiving opening for receiving the exchange tool; and
a ball catch for temporarily fixing the exchange tool on the receiving part, the ball catch comprising:
a sleeve that is closed on one side, the sleeve comprising an axis of symmetry; and
a spring-mounted press ball arranged in the sleeve and movable along the axis of symmetry for manually engaging and disengaging with the ball-receiving opening, wherein the exchange tool is moved into the receiving opening in an engagement direction which extends perpendicular to the axis of symmetry to engage the exchange tool with the receiving part.

10. The quick-change system of claim 9, wherein:
the ball-receiving opening comprises a central axis; and
a distance between the axis of symmetry and the central axis is 1 mm to 3.5 mm.

11. The quick-change system of claim 9, wherein the ball-receiving opening comprises a contact area with an edge break that contacts the press ball when the exchange tool is engaged with the receiving part.

12. The quick-change system of claim 9, wherein:
the receiving part comprises a centering pin and the exchange tool comprises a centering opening for receiving the centering pin; or
the exchange tool comprises a centering pin and the receiving part comprises a centering opening for receiving the centering pin.

* * * * *